US012476407B2

(12) United States Patent
Shettar et al.

(10) Patent No.: US 12,476,407 B2
(45) Date of Patent: Nov. 18, 2025

(54) LOW INSERTION FORCE CONTACT TERMINAL

(71) Applicants: TE Connectivity India Private Limited, Bangalore (IN); Tyco Electronics UK Ltd., Swindon (GB); TE Connectivity Solutions GmbH, Schaffhausen (CH)

(72) Inventors: Vinayakumar Shettar, Bangalore East Tulak (IN); John Marsh, Swindon (GB); Lawrence John Brekosky, Middletown, PA (US)

(73) Assignees: TE Connectivity India Private Limited, Bangalore (IN); Tyco Electronics UK Ltd., Swindon (GB); TE Connectivity Services GmbH, Schaffhausen (CH)

( * ) Notice: Subject to any disclaimer, the term of this patent is extended or adjusted under 35 U.S.C. 154(b) by 181 days.

(21) Appl. No.: 18/336,091

(22) Filed: Jun. 16, 2023

(65) Prior Publication Data

US 2023/0327359 A1 Oct. 12, 2023

Related U.S. Application Data

(63) Continuation of application No. 17/382,842, filed on Jul. 22, 2021, now Pat. No. 11,715,902.

(30) Foreign Application Priority Data

May 27, 2021 (IN) ............................. 202111023638

(51) Int. Cl.

*H01R 13/42* (2006.01)
*H01R 12/58* (2011.01)

(Continued)

(52) U.S. Cl.

CPC ........... *H01R 13/428* (2013.01); *H01R 12/58* (2013.01); *H01R 13/11* (2013.01);

(Continued)

(58) Field of Classification Search

CPC .... H01R 12/716; H01R 12/79; H01R 12/714; H01R 12/00; H01R 12/52; H01R 12/7082; H01R 12/585

See application file for complete search history.

(56) References Cited

U.S. PATENT DOCUMENTS

| | | | | |
|---|---|---|---|---|
| 3,654,592 A * | 4/1972 | Primorac ............. | H01R 12/721 439/862 |
| 3,963,316 A | 6/1976 | Williams | |

(Continued)

FOREIGN PATENT DOCUMENTS

| | | | |
|---|---|---|---|
| CA | 3107090 A1 | 1/2021 |
| WO | 2012116860 A1 | 9/2012 |
| WO | 2015035967 A1 | 3/2015 |

OTHER PUBLICATIONS

Extended European Search Report for European Application No. 22175952 dated Oct. 19, 2022.

*Primary Examiner* — Truc T Nguyen

(57) ABSTRACT

A low insertion force contact terminal which has a conductor mating portion, a securing portion and a substrate mating portion. The conductor mating portion is configured to terminate a conductor therein. The securing portion is configured to secure the terminal in a terminal receiving cavity of a housing. The substrate mating portion extends from the securing portion. The substrate mating portion has at least two sections which have curved portions thereon. At least one embossment is provided on a first section of the at least two sections or a second section of the at least two sections. The curved portions of the at least two sections move independently, which allows the curved portions to exert a (Continued)

low normal force on walls of through holes of a substrate to which the contact terminal is mated. The low normal force is sufficient to provide a stable electrical connection.

14 Claims, 8 Drawing Sheets

(51) Int. Cl.

| | |
|---|---|
| ***H01R 13/11*** | (2006.01) |
| ***H01R 13/428*** | (2006.01) |
| ***H01R 13/627*** | (2006.01) |
| ***H01R 13/629*** | (2006.01) |
| ***H01R 13/639*** | (2006.01) |

(52) U.S. Cl.

CPC ....... *H01R 13/6275* (2013.01); *H01R 13/629* (2013.01); *H01R 13/639* (2013.01)

(56) References Cited

U.S. PATENT DOCUMENTS

| | | | | | |
|---|---|---|---|---|---|
| 5,073,119 | A | 12/1991 | Soes | | |
| 5,209,680 | A | 5/1993 | Fry | | |
| 5,374,204 | A * | 12/1994 | Foley | H01R 13/114 | 439/82 |
| 5,876,241 | A | 3/1999 | Frantz | | |
| 6,036,545 | A | 3/2000 | Caviness et al. | | |
| 6,250,944 | B1 | 6/2001 | Jones | | |
| 6,319,021 | B1 * | 11/2001 | Billman | H01R 12/585 | 439/78 |
| 6,821,135 | B1 | 11/2004 | Martin | | |
| 9,368,886 | B2 | 6/2016 | Kallee | | |
| 10,153,597 | B1 * | 12/2018 | Polinski | H01R 24/58 | |
| 2006/0264076 | A1 * | 11/2006 | Chen | H01R 12/585 | 439/82 |
| 2011/0021089 | A1 * | 1/2011 | Yoshida | H01R 13/28 | 439/733.1 |
| 2012/0108083 | A1 * | 5/2012 | Wittig | H01R 4/184 | 439/78 |
| 2012/0231677 | A1 * | 9/2012 | Kallee | H01R 12/585 | 29/829 |
| 2013/0034976 | A1 | 2/2013 | Tonosaki | | |
| 2016/0164201 | A1 | 6/2016 | Endo et al. | | |
| 2022/0209439 | A1 * | 6/2022 | Hashiguchi | H01R 12/716 | |

* cited by examiner

LOW INSERTION FORCE CONTACT TERMINAL

CROSS REFERENCE TO RELATED APPLICATIONS

This application is a Continuation of and claims priority to U.S. application Ser. No. 17/382,842 filed on Jul. 22, 2021 which is incorporated herein by reference in its entirety.

FIELD OF THE INVENTION

The invention is directed to a contact terminal for making an electrical connection to a plated through hole of a substrate. In particular, the contact terminal is a low insertion force contact terminal with a compliant portion which can be used over many cycles.

BACKGROUND OF THE INVENTION

Contact terminals are often mated with through holes on substrates, to provide an electrical connection between the of terminals to the substrate, etc. However, the proper termination of the contact terminals to the substrate often requires the use of a header and one or more tools, as the insertion force and the normal force of the contact terminals is significant. In addition, the use of such contact terminals causes deformation to both the contact terminals and the through holes, preventing the contact terminals from being used over many cycles.

It would, therefore, be beneficial to provide contact terminals which overcomes the issues associated with known contact terminals. In particular, it would be beneficial to provide contact terminals which can be used over many cycles and which do not require tooling for insertion. It would also be beneficial to provide the low insertion force contact terminals in a connector housing which can be mated to the substrate without the need of a header.

SUMMARY OF THE INVENTION

The following provides a summary of certain illustrative embodiments of the present invention. This summary is not an extensive overview and is not intended to identify key or critical aspects or elements of the present invention or to delineate its scope.

An embodiment is directed to a low insertion force contact terminal which has a conductor mating portion, a securing portion and a substrate mating portion. The conductor mating portion is configured to terminate a conductor therein, using known methods of termination, such as, but not limited to, crimping, insulation displacement or welding. The securing portion is configured to secure the terminal in a terminal receiving cavity of a housing. The substrate mating portion extends from the securing portion. The substrate mating portion has at least two sections which have curved portions thereon. At least one embossment is provided on a first section of the at least two sections or a second section of the at least two sections. The curved portions of the at least two sections move independently, which allows the curved portions to exert a low normal force on walls of through holes of a substrate to which the contact terminal is mated. The low normal force is sufficient to provide a stable electrical connection while allowing for a low insertion force. The normal force may be, for example, 5 Newtons or less.

In an illustrative embodiment, the at least one embossment on the first section or the second section increases the frictional engagement between the first section and the second section, thereby increasing the normal force that the curved portions exert on the wall of the through holes. In another illustrative embodiment, the at least one embossment causes the first section and the second section to be locked together at the embossment, wherein deflection stress or stain transition applied to the substrate mating portion is prevented from being transferred to the securing portions.

In an illustrative embodiment, the at least one embossment is located on the securing portion, wherein the position of the at least one embossment does not increase the normal force that the curved portions exert on the wall of the through holes. In another illustrative embodiment, the at least one embossment is spaced from the securing portion toward a free end of the substrate mating portion, wherein the position of the at least one embossment increases the normal force that the curved portions exert on the wall of the through holes.

In an illustrative embodiment, a first section of the at least two sections of the substrate mating portion is a first planar piece of conductive material and a second section of the at least two sections is a second planar piece of conductive material which is folded over at an edge to place second planar pieces of conductive material on top of the first planar pieces of conductive material.

In an illustrative embodiment, the securing portion is formed by folding planar conductive material into a box shaped member with a top wall, an oppositely facing bottom wall, a first side wall and a second side wall. A first section of the at least two sections of the substrate mating portion is a first resilient arm which extends from the first side wall and a second section of the at least two sections of the substrate mating portion is a second resilient arm which extends from the second side wall.

In an illustrative embodiment, a first section of the at least two sections of the substrate mating portion is a first arm which extends from the top wall and a second section of the at least two sections of the substrate mating portion is a second arm which extends from the bottom wall. The first arm has a fork like configuration with a first resilient arm and a second resilient arm, the first resilient arm has a first curved portion of the curved portion provided proximate a free ends of the first resilient arm and the second resilient arm has a second curved portion provided proximate a free end of the second resilient arm.

In an illustrative embodiment, the first resilient arm has a first planar portions, a first u-shaped portion and a first curved portion. The first curved portion extends from the first u-shaped portion back toward the securing portion, the second resilient arm has a second planar portion, a second u-shaped portion and a second curved portion. The second curved portion extends from the second u-shaped portion back toward the securing portion.

Additional features and aspects of the present invention will become apparent to those of ordinary skill in the art upon reading and understanding the following detailed description of the illustrative embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more illustrative embodiments of the invention and, together with the general description given above and detailed description given below, serve to explain the principles of the invention, and wherein.

DETAILED DESCRIPTION OF THE INVENTION

Figure 1:
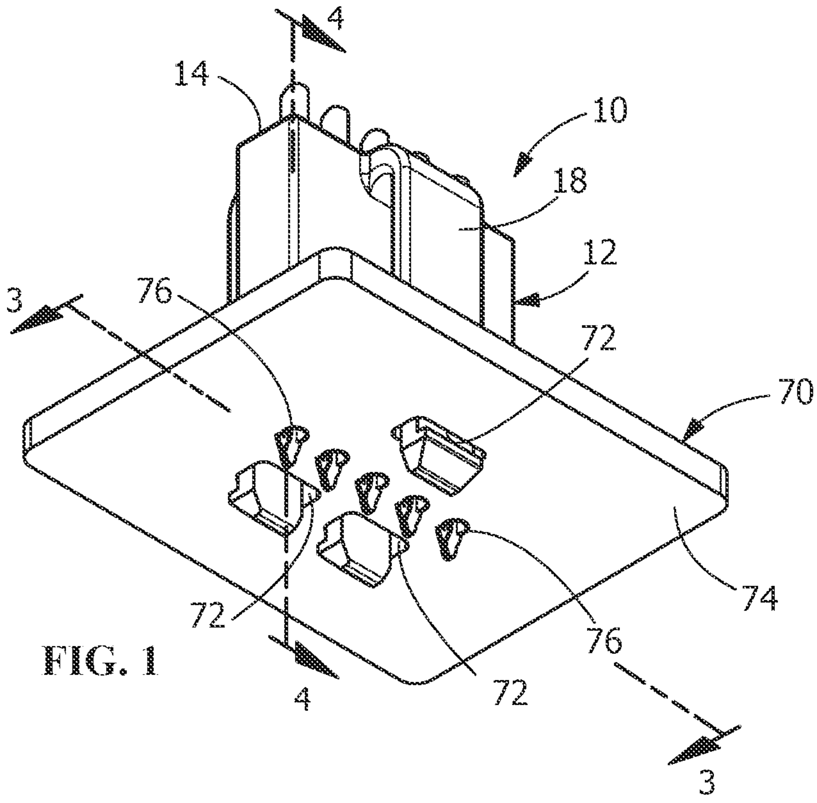
FIG. 1 is a perspective view of an illustrative connector housing with contact terminals of the present invention mated to a substrate.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Illustrative embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As shown in FIGS. 1 through 4, a first illustrative embodiment of a connector 10 has a housing 12 with a wire receiving end 14 and a substrate mating end 16. Latching arms 18 extend from proximate the wire receiving end 14 to beyond the substrate mating end 16. The latch arms 18 have lead-in surfaces 20 proximate free ends thereof. Latching shoulders 22 are provided proximate the lead-in surfaces 20. In the illustrative embodiment, three latching arms 18 are provided, with two extending from one side of the housing 12 and the third extending from the opposite side of the housing 12. However, other numbers and configurations of latching arms 18 may be used. In addition, the latching arms may be provided on an additional part which is mated with the housing.

Figure 4:
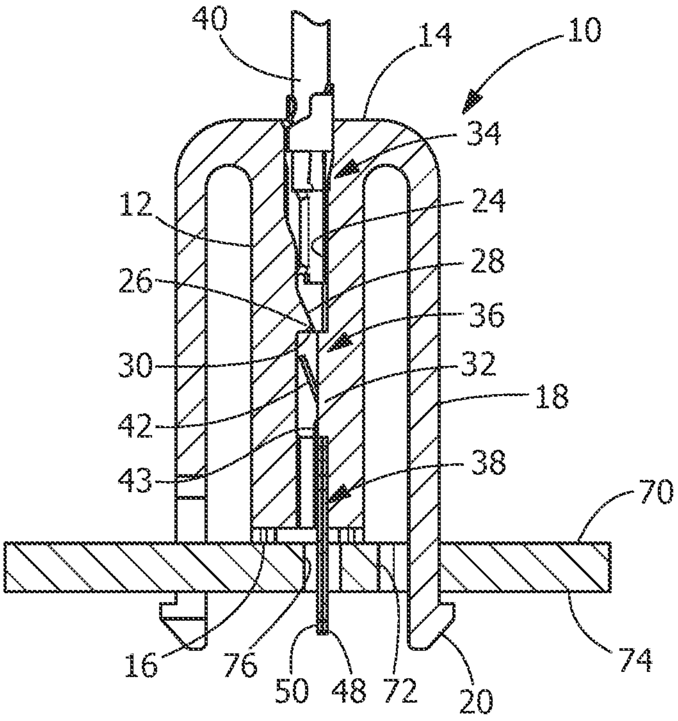
FIG. 4 is a cross-sectional view taken along line 4-4 of FIG. 1, showing a respective contact terminal in a fully mated position.

The housing 12 has terminal receiving cavities 24 extend from the wire receiving end 14 to the substrate mating end 16. As shown in FIG. 4, locking projections 26 are provided in the terminal receiving cavities 24. The locking projections 26 are spaced from both the wire receiving end 14 and the substrate mating end 16. The locking projections 26 have lead-in surfaces 28 which face toward the wire receiving end 14 and locking shoulders 30 which face toward the substrate mating end 16.

Figure 5:
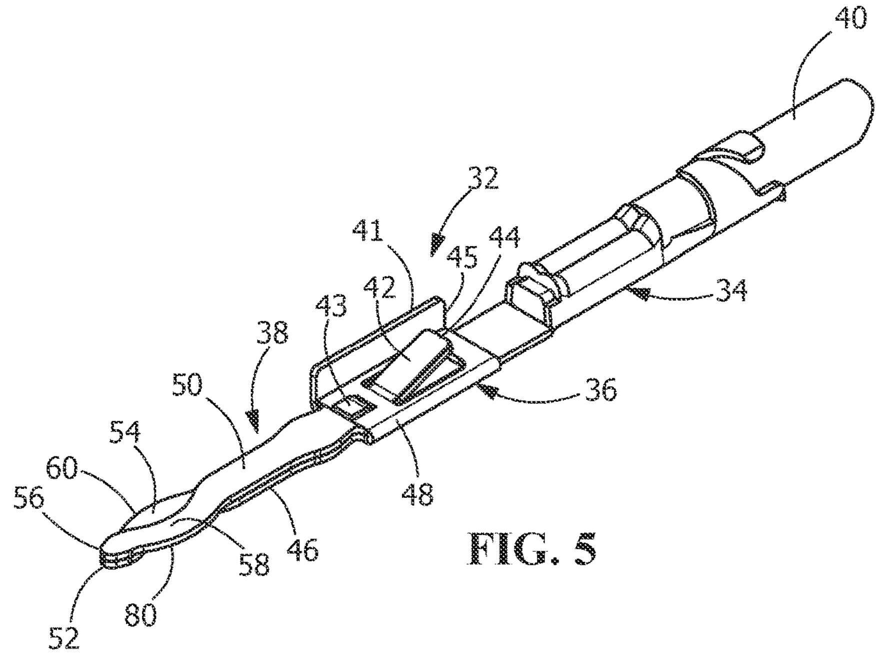
FIG. 5 is a perspective view of a contact terminal shown in FIG. 1.
Figure 6:
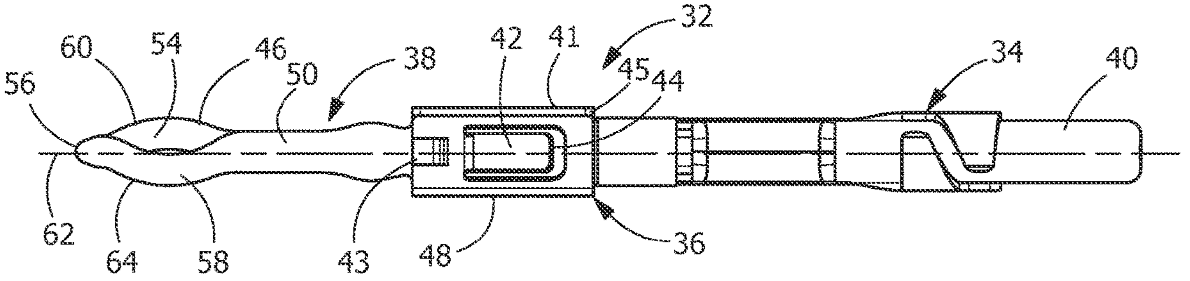
FIG. 6 is a top view of the contact terminal of FIG. 5.
Figure 7:
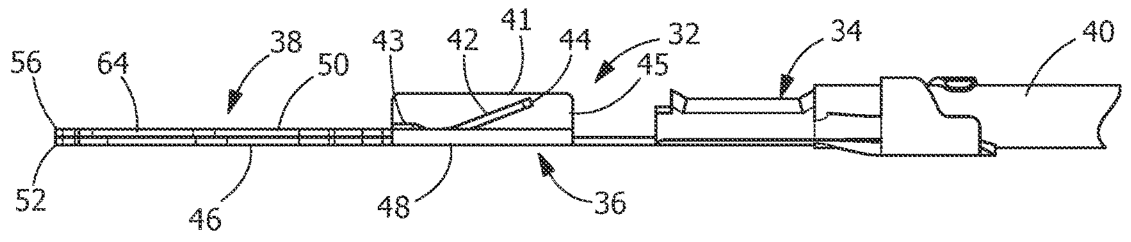
FIG. 7 is a side view of the contact terminal of FIG. 5.

Contact terminals 32 are positioned in the terminal receiving cavities 24. As shown in FIGS. 5 through 7, the contact terminals 32 have conductor mating portions 34, securing portions 36 and substrate mating portions 38. The conductor mating portions 34 are configured to terminate conductors 40 therein. The conductors 40 may be terminated by crimping, insulation displacement, soldering or using other known methods of termination.

The securing portions 36 have resilient locking arms 42. The resilient locking arms 42 extend from securing portions 36 whereby locking surfaces 44 are provided at free ends of the locking arms 42. The locking arms 42 and the locking surfaces 44 cooperate with the locking projections 26 and the locking shoulders 30 to retain the terminals 32 in position in the terminal receiving cavities 24, as shown in FIG. 4. In addition, in various illustrative embodiments, locking walls 41 with locking surfaces 45 may be provided to cooperate with the additional locking projections and additional locking shoulders to retain the terminals 32 in position in the terminal receiving cavities 24.

The securing portions 36 and the substrate mating portions 38 are formed by first planar sections or pieces of conductive material 46 which are folded over at edges 48 to place folded over or second planar sections or pieces of conductive material 50 on top of the first planar pieces of conductive material 46. This effectively doubles the thickness of the conductive material at the substrate mating portions 38.

The first planar sections of conductive material 46 extend from the securing portions 36 to free ends 52. Curved portions 54 are provided proximate the free ends 52. The second planar sections of conductive material 50 extend from the securing portions 36 to free ends 56. Curved portions 58 are provided proximate the free ends 56. With the exceptions of the curved portions 52, 58, the first planar sections 46 and the second planar sections 50 are provided in line, with the second planar sections 50 being positioned on top of the first planar sections 46 in the illustrative orientation shown in FIGS. 5 through 7.

The curved portions 54 are curved such that edges 60 of the curved portions 54 extend away from the longitudinal axes 62 of the substrate mating portions 38. The curved portions 58 are curved such that edges 64 of the curved portions 58 extend away from the longitudinal axes 62 of the substrate mating portions 38. The curved portions 58 extend in a direction from the longitudinal axes 62 in the opposite direction as the curved portions 54.

In use, the connector 10 is moved into engagement with a substrate 70, such as, but not limited to a panel or a printed circuit board, as shown in FIG. 1. In the fully inserted position, the ends of the latching arms 18 are positioned in latch receiving openings 72 in the substrate 70. When fully inserted, the latching shoulders 22 are engage, and are biased against, a surface 74 of the substrate 70 to removably retain the connector 10 in position on the substrate 70. Alternatively, the latch arms 18 may have an interference fit with the latch receiving openings 72 or an additional component may be provided to ensure that the connector 10 is positively positioned and prevented from movement relative to the substrate 70.

Figure 2:
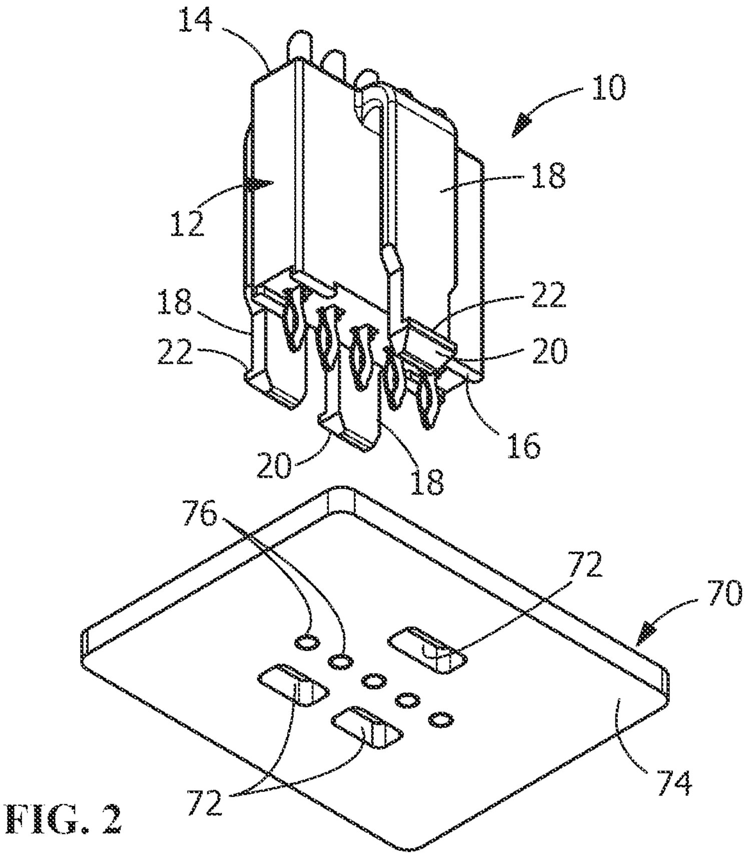
FIG. 2 is a perspective view of the connector housing with contact terminals of HG, 1 removed from the substrate.
Figure 3:
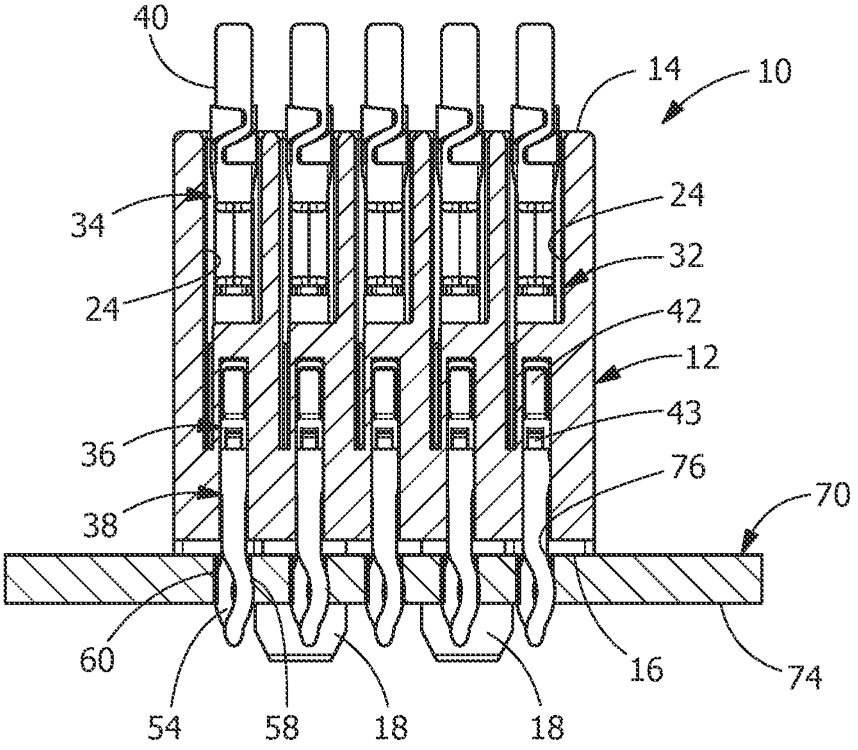
FIG. 3 is a cross-sectional view taken along line 3-3 of FIG. 1, showing the contact terminals in a fully mated position.

As the connector 10 is moved from the position shown in FIG. 2 to the position shown in FIG. 1, the substrate mating portions 38 are moved into plated through holes 76 in the substrate 70. As insertion continues, the curved portions 54, 58 engage the walls of the through holes 76, causing the curved portions 54, 58 and the first and the second planar sections 46, 50 to be resiliently deformed inward, toward each other, while retaining elastic energy. As the curved portions 54 are on the first planar sections 46 and the curved portions 58 are on the second planar sections 50, the movement of the curved portions 54 is independent of the movement of the curved portions 58. This allows the movement of the curved portions 54, 58 to occur with little force, thereby allowing the terminals 32 and the connector 10 to be inserted onto the substrate 70 with low insertion force. The low insertion force allows the connector 10 to be inserted onto the substrate by a user or operator without the need for additional tooling.

Once inserted and position in the through holes 70, as shown in FIG. 1, the edges 60, 64 of the curved portions 54, 58 engage the walls of the through holes 76 and exert normal forces on the walls of the through holes 76, as the first and the second planar sections 46, 50 attempt to move back toward their unstressed position. The normal force is sufficient to provide a stable electrical connection while allowing for a low insertion force. The normal force may be, for example, 5 Newtons or less. However, other normal forces may be obtained by alterations of the configuration of the first and the second planar sections 46, 50. The use of terminals 32 with low normal forces allows the terminals 32, connector 10 and the through holes 76 to be used over many cycles. For example, at least one detent or embossment 43 may be provided on the first planar section 46 and/or the second planar section 50 of each terminal 32.

The at least one embossment 43 on the first section 46 and/or the second section 50 can be used to increase the frictional engagement between the first section 46 and the second section 50, thereby increasing the normal force that the curved portions 54, 58 exert on the wall of the through holes 76. In addition or alternatively, the at least one embossment 43 on the first section 46 and/or the second section 50 can cause the first section 46 and the second section 50 to be locked together at the at least one embossment 43, wherein deflection stress or stain transition applied to the substrate mating portion 38 is prevented from being transferred to the securing portions 36.

The at least one embossment 43 may be located on the securing portion 36 proximate the locking arm 42. In this position, the at least one embossment 43 does not significantly increase the normal force that the curved portions 54, 58 exert on the wall of the through holes. However, the at least one embossment 43, prevents the deflection stress or stain transition applied to the substrate mating portion 38 from being transferred to the securing portions 36 and the conductor mating portion 34.

Alternatively, the at least one embossment 43 may be located spaced from the securing portion 36 toward a free end 56 of the substrate mating portion 38. In this position, the at least one embossment 43 does increases the normal force that the curved portions 54, 58 exert on the wall of the through holes and. the deflection stress or stain transition applied to the substrate mating portion 38 from being transferred to the securing portions 36 and the conductor mating portion 34.

Figure 8:
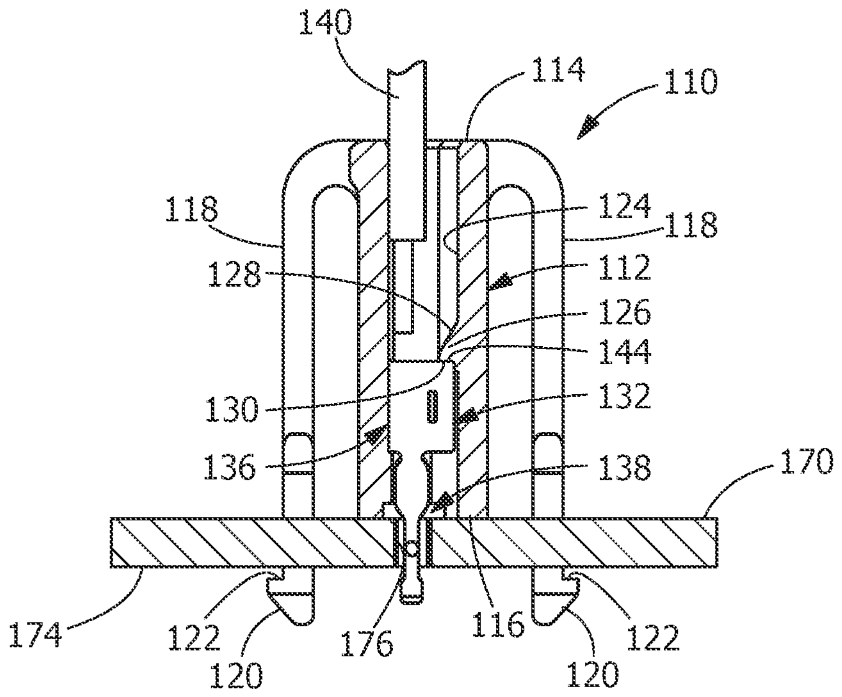
FIG. 8 is a cross-sectional view of a second illustrative connector housing with second illustrative contact terminals the second contact terminals are shown in a fully mated position.
Figure 9:
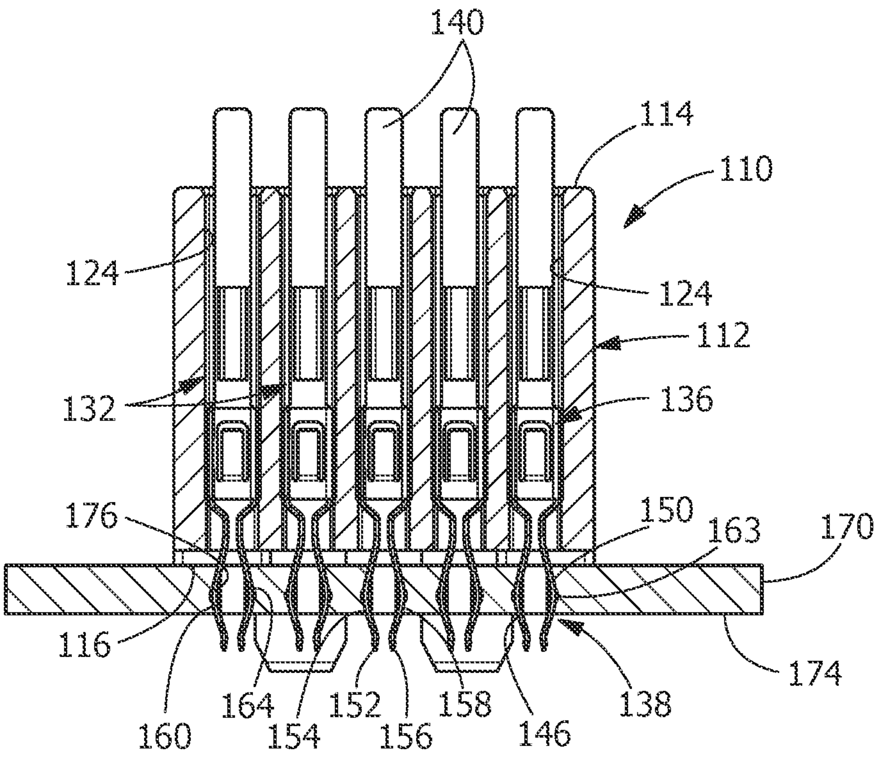
FIG. 9 is another cross-sectional view of the second illustrative connector housing with second illustrative contact terminals, the second contact terminals are shown in a fully mated position.

As shown in FIGS. 8 and 9, a second illustrative embodiment of a connector 110 has a housing 112 with a wire receiving end 114 and a substrate mating end 116. Latching arms 118 extend from proximate the wire receiving end 114 to beyond the substrate mating end 116. The latch arms 118 have lead-in surfaces 120 proximate free ends thereof. Latching shoulders 122 are provided proximate the lead-in surfaces 120.

The housing 112 has terminal receiving cavities 124 which extend from the wire receiving end 114 to the substrate mating end 116. As shown in FIG. 8, locking projections 126 are provided in the terminal receiving cavities 124. The locking projections 126 are spaced from both the wire receiving end 114 and the substrate mating end 116. The locking projections 126 have lead-in surfaces 128 which face toward the wire receiving end 114 and locking shoulders 130 which face toward the substrate mating end 116.

Figure 10:
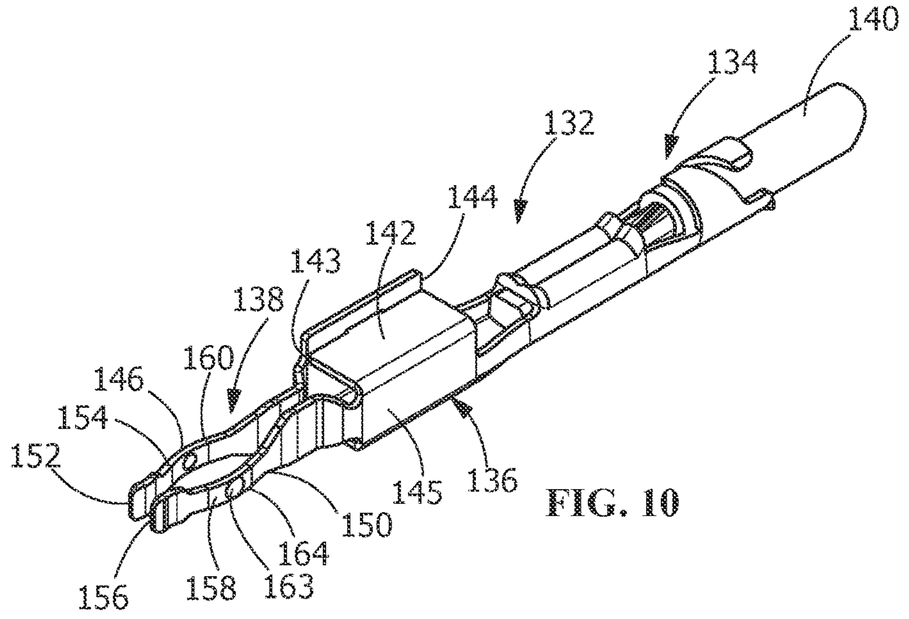
FIG. 10 is a perspective view of the contact terminal shown in FIG. 8.
Figure 11:
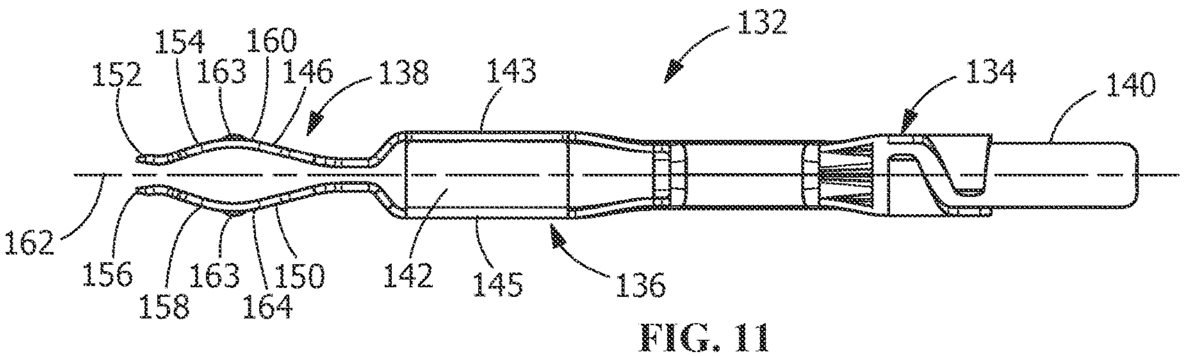
FIG. 11 is a top view of the contact terminal of FIG. 10.
Figure 12:
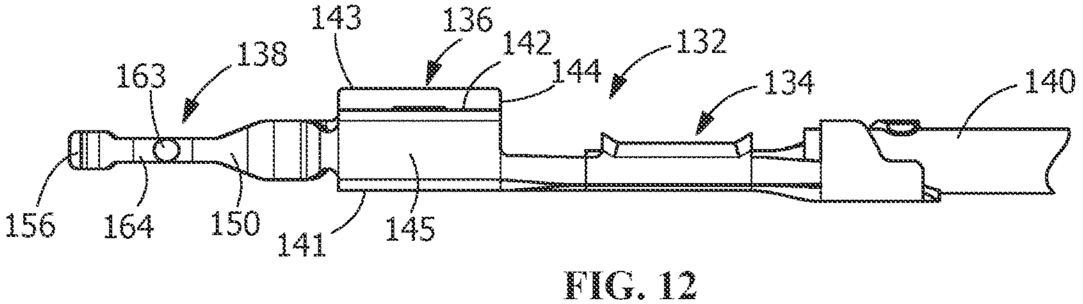
FIG. 12 is a side view of the contact terminal of FIG. 10.

Contact terminals 132 are positioned in the terminal receiving cavities 124. As shown in FIGS. 10 through 12, the contact terminals 132 have conductor mating portions 134, securing portions 136 and substrate mating portions 138. The conductor mating portions 134 are configured to terminate conductors 140 therein. The conductors 140 may be terminated by crimping, insulation displacement, soldering or using other known methods of termination.

The securing portions 136 have locking walls 143. The locking walls 143 have locking surfaces 144. The locking walls 143 and the locking surfaces 144 cooperate with the locking projections 126 and the locking shoulders 130 to retain the terminals 132 in position in the terminal receiving cavities 124, as shown in FIG. 8. The securing portions 136 are formed by folding planar conductive material into box shaped members with top walls 142, oppositely facing bottom walls 141, first side or locking walls 143 and second side walls 145.

The substrate mating portions 138 have first resilient sections or arms 146 which extend from the first side walls 143 and second resilient sections or arms 150 which extend from the second side walls 145.

The first resilient arms 146 extend from the securing portions 136 to free ends 152. The first resilient arms 146 are formed to have curved portions 154 provided proximate the free ends 152. The second resilient arms 150 extend from the securing portions 136 to free ends 156. The second resilient arms 150 are formed to have curved portions 158 provided proximate the free ends 156.

The curved portions 154 are curved such that faces 160 of the curved portions 154 extend away from the longitudinal axes 162 of the substrate mating portions 138. The curved portions 158 are curved such that faces 164 of the curved portions 158 extend away from the longitudinal axes 162 of the substrate mating portions 138. The curved portions 158 extend in a direction from the longitudinal axes 162 in the opposite direction as the curved portions 154. Projections or dimples 163 are provide on the faces 160, 164 of the curved portions 154, 158.

In use, the connector 110 is moved into engagement with a substrate 170, such as, but not limited to a panel or a printed circuit board. In the fully inserted position, the ends of the latching arms 118 are positioned in latch receiving openings (not shown) in the substrate 70. When fully inserted, the latching shoulders 22 are positioned below or engage a surface 174 of the substrate 170 to removably retain the connector 110 in position on the substrate 170. Alternatively, the latch arms 118 may have an interference fit with the latch receiving openings 172 or an additional component may be provided to ensure that the connector 110 is positively positioned and prevented from movement relative to the substrate 170.

As the connector 110 is inserted onto the substrate 170, the substrate mating portions 138 are moved into plated through holes 176 in the substrate 170. As insertion continues, the curved portions 154, 158 engage the walls of the through holes 176, causing the curved portions 154, 158 and the first and second resilient arms 146, 150 to be resiliently deformed inward, toward each other, while retaining elastic energy. As the curved portions 154 are on first resilient arms 146 and the curved portions 158 are on the second resilient arms 150, the movement of the curved portions 154 is independent of the movement of the curved portions 158. This allows the movement of the curved portions 154, 158 to occur with little force, thereby allowing the terminals 132 and the connector 110 to be inserted onto the substrate 170 with low insertion force. The low insertion force allows the connector 110 to be inserted onto the substrate by a user or operator without the need for additional tooling.

Once inserted and position in the through holes 170, as shown in FIG. 9, the projections 163 of the curved portions 154, 158 engage the walls of the through holes 176 and exert normal forces on the walls of the through holes 176, as the first and the second resilient arms 146, 150 attempt to move back toward their unstressed position. The normal force is sufficient to provide a stable electrical connection while allowing for a low insertion force. The normal force may be, for example, 5 Newtons or less. However, other normal forces may be obtained by alterations of the configuration of the first and the second resilient arms 146, 150. The use of terminals 132 with low normal forces allows the terminals 132, connector 110 and the through holes 176 to be used over many cycles.

Figure 13:
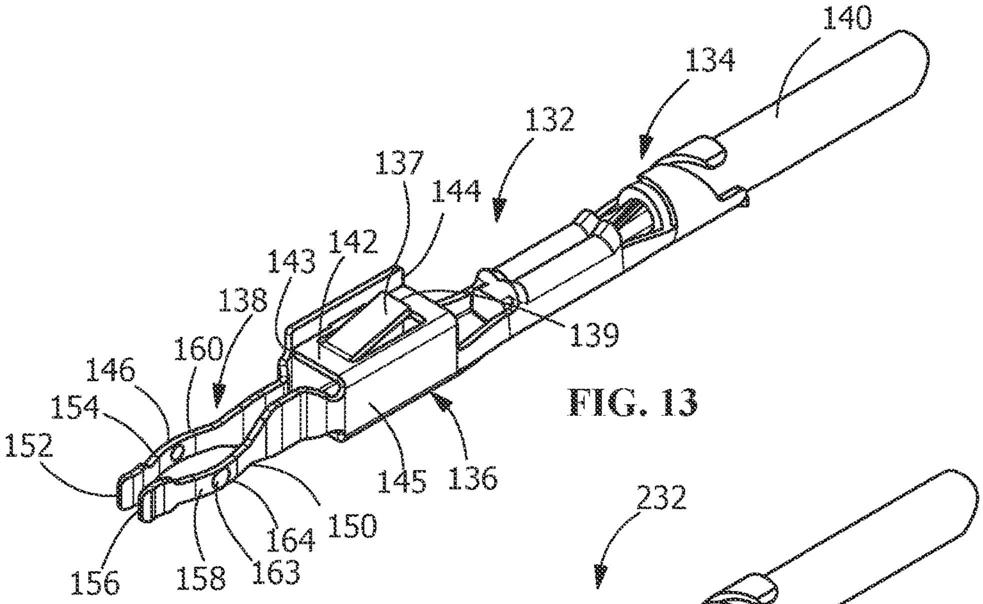
FIG. 13 is a perspective view of a contact terminal which is similar to that shown in FIG. 10, with a resilient locking arm provided thereon.

FIG. 13 illustrates contact terminals which is similar to contact terminals 132. However, in this embodiment the contact securing portions 136 have resilient locking arms 137. The resilient locking arms 137 extend from securing portions 136 whereby locking surfaces 139 are provided at free ends of the locking arms 137. The locking arms 137 and the locking surfaces 139 cooperate with the locking projections 126 and the locking shoulders 130 to retain the terminals 132 in position in the terminal receiving cavities 124.

Figure 14:
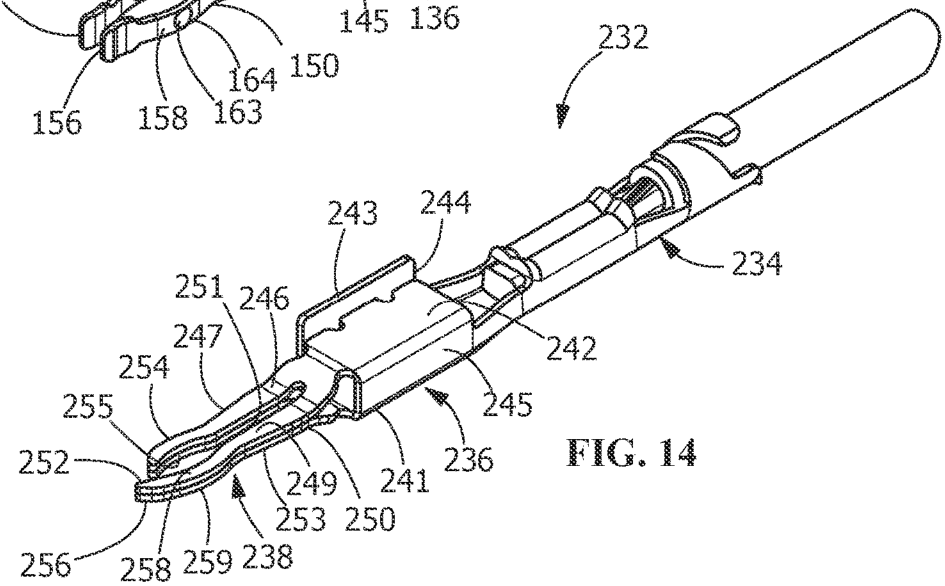
FIG. 14 is a perspective view of another illustrative contact terminal.
Figure 15:
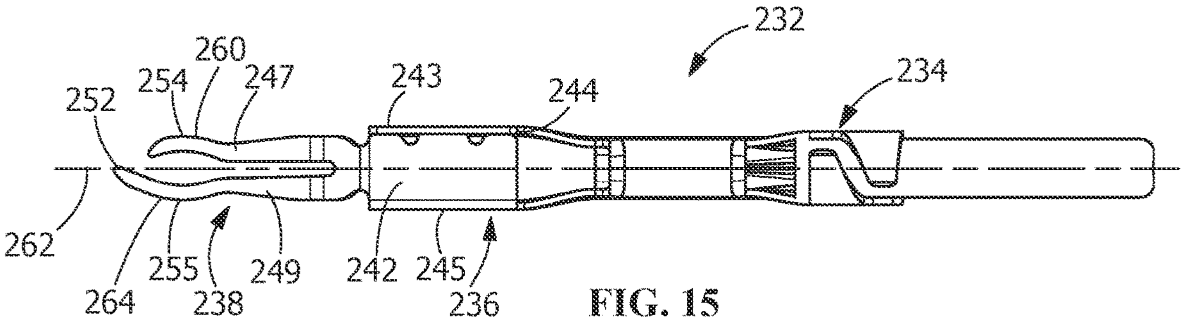
FIG. 15 is a top view of the contact terminal of FIG. 14.
Figure 16:
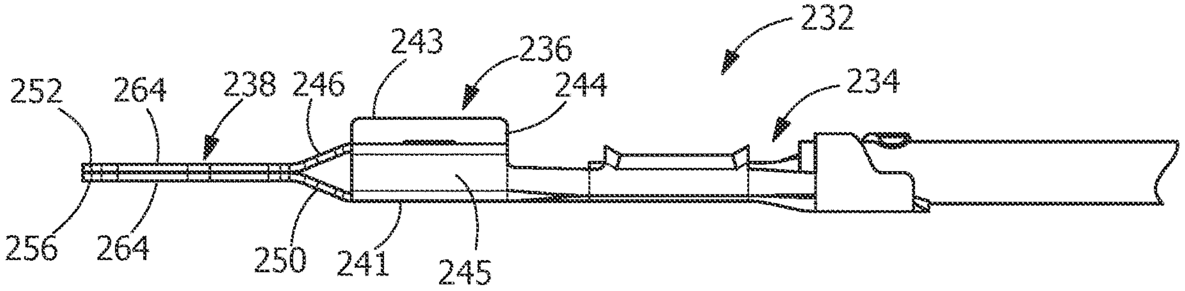
FIG. 16 is a side view of the contact terminal of FIG. 14.

A third illustrative embodiment of contact terminals 232 is shown in FIGS. 14 through 16. The contact terminals 232 have conductor mating portions 234, securing portions 236 and substrate mating portions 238. The conductor mating portions 234 are configured to terminate conductors 240 therein. The conductors 240 may be terminated by crimping, insulation displacement, soldering or using other known methods of termination.

The securing portions 236 have locking walls 243. The locking walls 243 have locking surfaces 244. The securing portions 236 are formed by folding planar conductive material into box shaped members with top walls 242, oppositely facing bottom walls 241, first side or locking walls 243 and second side walls 245.

The substrate mating portions 238 have first arms 246 which extend from the top walls 242 and second arms 250 which extend from the bottom walls 241. The first arms 246 extend from the securing portions 236 to free ends 252. The first arms 246 have a fork like configuration with first resilient arms 247 and second resilient arms 249. The first resilient arms 247 are formed to have curved portions 254 provided proximate the free ends 252. The second resilient arms 249 are formed to have curved portions 258 provided proximate the free ends 252.

The second arms 250 extend from the securing portions 236 to free ends 256. The first arms 250 have a fork like configuration with first resilient arms 251 and second resilient arms 253. The first resilient arms 251 are formed to have curved portions 255 provided proximate the free ends 256. The second resilient arms 253 are formed to have curved portions 259 provided proximate the free ends 256. The first arms 246 and the second arms 250 are provided in line, with the first arms 246 being positioned on top of the second arms 250 in the illustrative orientation shown in FIGS. 13 through 15.

The curved portions 254, 255 are curved such that edges 260 of the curved portions 254, 255 extend away from the longitudinal axes 262 of the substrate mating portions 238. The curved portions 258, 259 are curved such that edges 264 of the curved portions 258, 259 extend away from the longitudinal axes 262 of the substrate mating portions 238. The curved portions 258, 259 extend in a direction from the longitudinal axes 262 in the opposite direction as the curved portions 254, 255.

In use, as the terminals 232 are moved into through holes of a substrate (not shown) the curved portions 254, 255, 258, 259 engage the walls of the through holes, causing the curved portions 254, 255, 258, 259 and the resilient arms 247, 249, 251, 253 to be resiliently deformed inward, toward each other, while retaining elastic energy. As the curved portions 254, 255, 258, 259 are positioned on different resilient arms 247, 249, 251, 253, the movement of the curved portions 254, 255, 258, 259 is independent of the other curved portions. This allows the movement of the curved portions 254, 255, 258, 259 to occur with little force, thereby allowing the terminals 232 to be inserted onto the substrate with low insertion force. The low insertion force allows the terminals 232 to be inserted onto the substrate by a user or operator without the need for additional tooling.

Once inserted and position in the through holes of the substrate, the edges 260, 264 of the curved portions 254, 255, 258, 259 engage the walls of the through holes and exert normal forces on the walls of the through holes, as the resilient arms 247, 249, 251, 253 attempt to move back toward their unstressed position. The normal force is sufficient to provide a stable electrical connection while allowing for a low insertion force. The normal force may be, for example, 5 Newtons or less. However, other normal forces may be obtained by alterations of the configuration of the resilient arms 247, 249, 251, 253. The use of terminals 232 with low normal forces allows the terminals 232 to be used over many cycles.

Figure 17:
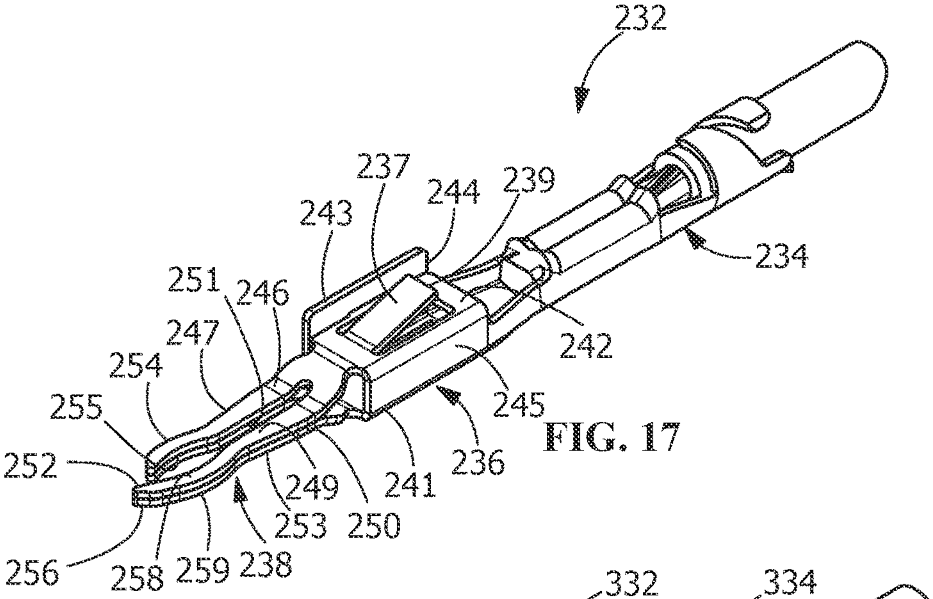
FIG. 17 is a perspective view of a contact terminal which is similar to that shown in FIG. 14, with a resilient locking arm provided thereon.

FIG. 17 illustrates contact terminals which is similar to contact terminals 232. However, in this embodiment the contact securing portions 236 have resilient locking arms 237. The resilient locking arms 237 extend from securing portions 236 whereby locking surfaces 239 are provided at free ends of the locking arms 237. The locking arms 237 and the locking surfaces 239 cooperate with the locking projections and the locking shoulders to retain the terminals 232 in position in the terminal receiving cavities.

Figure 18:
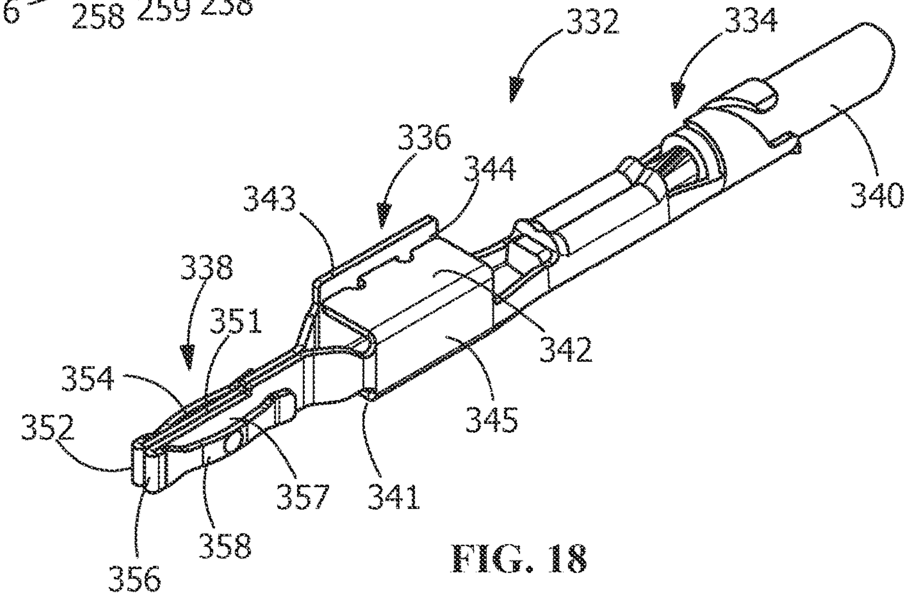
FIG. 18 is a perspective view of a fourth illustrative contact terminal.
Figure 19:
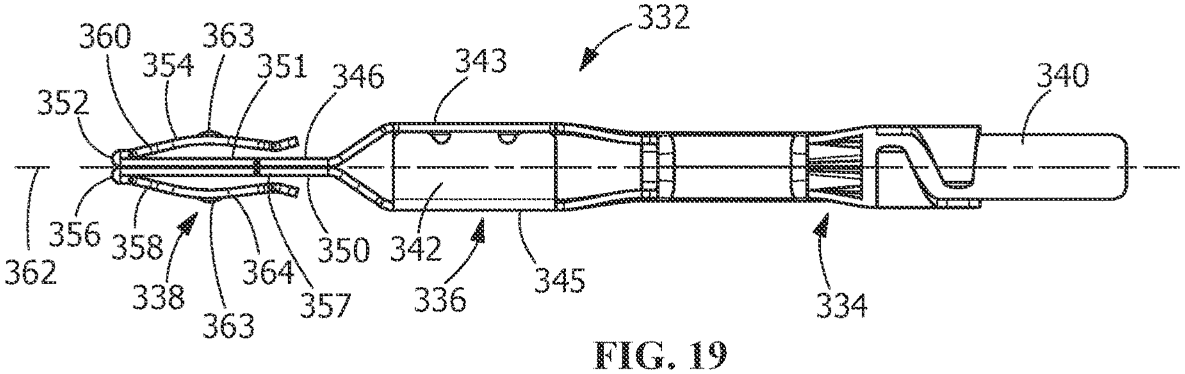
FIG. 19 is a top view of the contact terminal of FIG. 18.
Figure 20:
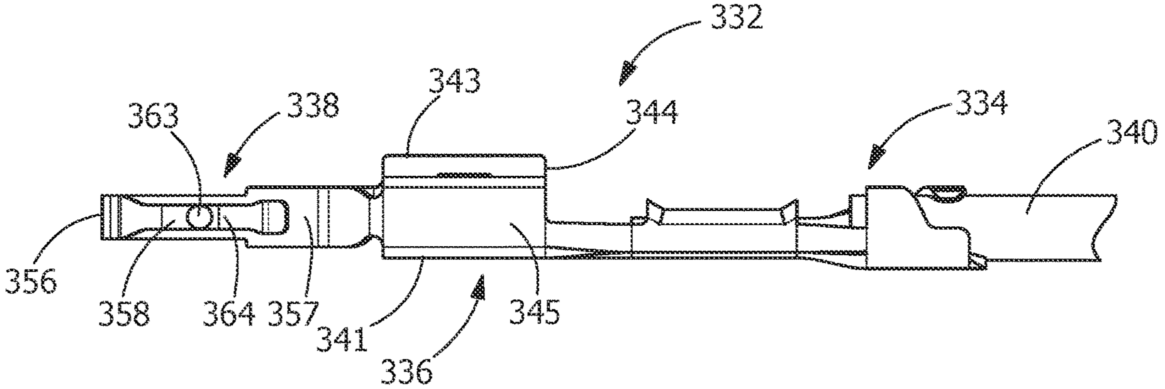
FIG. 20 is a side view of the contact terminal of FIG. 18.

A fourth illustrative embodiment of contact terminals 332 is shown in FIGS. 18 through 20. The contact terminals 332 have conductor mating portions 334, securing portions 336 and substrate mating portions 338. The conductor mating portions 334 are configured to terminate conductors 340 therein. The conductors 340 may be terminated by crimping, insulation displacement, soldering or using other known methods of termination.

The securing portions 336 have locking walls 343. The locking walls 343 have locking surfaces 344. The locking walls 343 and the locking surfaces 344. The securing portions 336 are formed by folding planar conductive material into box shaped members with top walls 342, oppositely facing bottom walls 341, first side or locking walls 343 and second side walls 345.

The substrate mating portions 338 have first resilient arms 346 which extend from the first side walls 343 and second resilient arms 350 which extend from the second side walls 345. The first resilient arms 346 have first planar portions 353, u-shaped portions 352 and curved portions 354. The curved portions 354 extend from the u-shaped portions 352 back toward the securing portions 336. The second resilient arms 350 have second planar portions 357, u-shaped portions 356 and curved portions 358. The curved portions 358 extend from the u-shaped portions 356 back toward the securing portions 336.

The curved portions 354 are curved such that faces 360 of the curved portions 354 extend away from the longitudinal axes 362 of the substrate mating portions 338. The curved portions 358 are curved such that faces 364 of the curved portions 358 extend away from the longitudinal axes 362 of the substrate mating portions 338. The curved portions 358 extend in a direction from the longitudinal axes 362 in the opposite direction as the curved portions 354. Projections or dimples 363 are provide on the faces 360, 364 of the curved portions 354, 358.

In use, as the terminals 332 are moved into through holes of a substrate (not shown) the curved portions 354, 358 engage the walls of the through holes, causing the curved portions 354, 358 to be resiliently deformed inward, toward each other, while retaining elastic energy. As the curved portions 354, 358 are positioned on different resilient arms 346, 350, the movement of the curved portions 354 is independent of the curved portions 358. This allows the movement of the curved portions 354, 358 to occur with little force, thereby allowing the terminals 332 to be inserted onto the substrate with low insertion force. The low insertion force allows the terminals 332 to be inserted onto the substrate by a user or operator without the need for additional tooling.

Once inserted and position in the through holes of the substrate, the projections 363 of the curved portions 354, 358 engage the walls of the through holes and exert normal forces on the walls of the through holes, as the curved portions 354, 358 attempt to move back toward their unstressed position. The normal force is sufficient to provide a stable electrical connection while allowing for a low insertion force. The normal force may be, for example, 5 Newtons or less. However, other normal forces may be obtained by alterations of the configuration of the curved portions 354, 358. The use of terminals 332 with low normal forces allows the terminals 332 to be used over many cycles.

Figure 21:
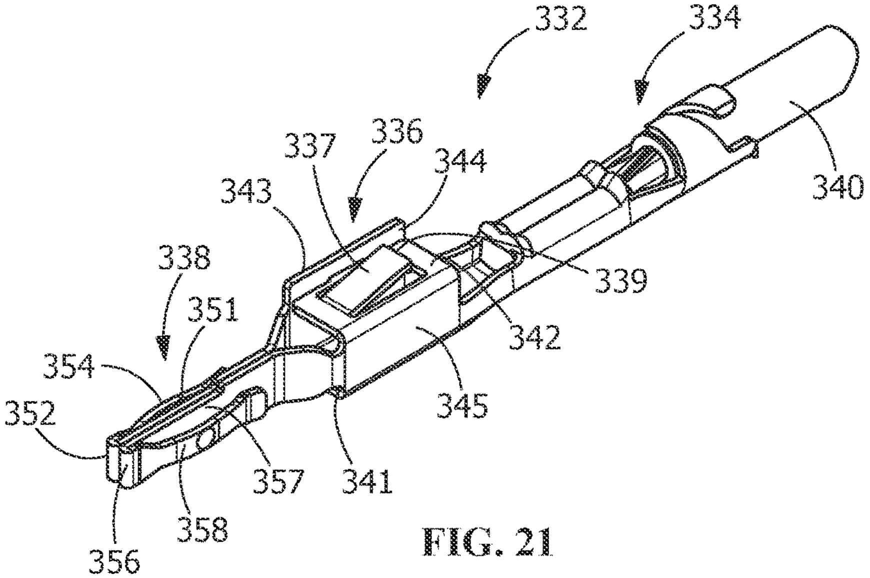
FIG. 21 is a perspective view of a contact terminal which is similar to that shown in FIG. 18, with a resilient locking arm provided thereon.

FIG. 21 illustrates contact terminals which are similar to contact terminals 332. However, in this embodiment the contact securing portions 336 have resilient locking arms 337. The resilient locking arms 337 extend from securing portions 336 whereby locking surfaces 339 are provided at free ends of the locking arms 337. The locking arms 337 and the locking surfaces 339 cooperate with the locking projections and the locking shoulders to retain the terminals 332 in position in the terminal receiving cavities.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A low insertion force contact terminal comprising:

a conductor mating portion for terminating a conductor therein;

a securing portion for securing the contact terminal in a terminal receiving cavity of a housing;

a substrate mating portion extending from the securing portion, the substrate mating portion having at least two sections which have curved portions thereon, the curved portions having curved edges which extend away from a longitudinal axis of the substrate mating portions, at least one embossment provided on a first section of the at least two sections or a second section of the at least two sections, the first section being folded over at a fold edge to place the second section on top of and in engagement with the first section;

wherein the curved portions of the at least two sections move independently, causing the curved edges of the curved portions to exert a normal force on walls of through holes of a substrate to which the contact terminal is mated which is sufficient to provide a stable electrical connection while allowing for a low insertion force;

wherein the at least one embossment on the first section or the second section increases the frictional engagement between the first section and the second section, thereby increasing the normal force that the curved edges of the curved portions exert on the wall of the through holes.

2. The low insertion force contact terminal as recited in claim 1, wherein the at least one embossment causes the first section and the second section to be locked together at the embossment, wherein deflection stress or stain transition applied to the substrate mating portion caused by the movement of the two sections when positioned in the through holes of the substrate is prevented from being transferred to the securing portions.

3. The low insertion force contact terminal as recited in claim 1, wherein a first curved portion of the curved portions extends away from the longitudinal axis and a second curved portion of the curved portions extend in a direction from the longitudinal axis in the opposite direction as the first curved portion.

4. The low insertion force contact terminal as recited in claim 1, wherein the securing portion has a resilient locking arm with a locking surface provided at a free end of the locking arm.

5. The low insertion force contact terminal as recited in claim 1, wherein the normal force is equal to or less than 5 Newtons.

6. The low insertion force contact terminal as recited in claim 1, wherein the contact terminal is positioned in a housing of a connector, the connector having one or more connector latching arms which cooperate with openings in the substrate to properly position and lock the connector to the substrate.

7. The low insertion force contact terminal as recited in claim 1, wherein a first face of the first curved portion extends away from a longitudinal axes of the substrate mating portions and a second face of the second curved portion extends away from the longitudinal axes in the opposite direction as the first curved portions.

8. The low insertion force contact terminal as recited in claim 1, wherein the securing portions have locking walls with locking surfaces.

9. The low insertion force contact terminal as recited in claim 1, wherein the first planar piece of conductive material extends from the securing portion to a first free end of the substrate mating portion, a first curved portion of the first planar piece is provided proximate the first free end.

10. The low insertion force contact terminal as recited in claim 9, wherein the second planar piece of conductive material extends from the securing portion to a second free end of the substrate mating portion, a second curved portion of the second planar piece is provided proximate the second free end.

11. The low insertion force contact terminal as recited in claim 1, wherein as the contact terminal is mated to the substrate, the substrate mating portion is moved into the through holes in the substrate, causing the curved portions to engage the walls of the through holes, causing the curved portions and the first and the second planar pieces to be resiliently deformed inward, toward each other, while retaining elastic energy.

12. The low insertion force contact terminal as recited in claim 11, wherein as movement of the first curved portion on the first planar piece and the second curved portion on the second planar pieces are independent, the movement of the curved portions occur with little resistance, allowing the contact terminals to be inserted onto the substrate with low insertion force.

13. The low insertion force contact terminal as recited in claim 1, wherein the at least one embossment is located on the securing portion, the position of the at least one embossment does not increase the normal force that the curved portions exert on the wall of the through holes.

14. The low insertion force contact terminal as recited in claim 1, wherein the at least one embossment is spaced from the securing portion toward a free end of the substrate mating portion, the position of the at least one embossment increases the normal force that the curved portions exert on the wall of the through holes.

* * * * *